(12) United States Patent
Nakagawa et al.

(10) Patent No.: US 10,137,763 B2
(45) Date of Patent: Nov. 27, 2018

(54) HEAT-PUMP-TYPE VEHICLE AIR-CONDITIONING SYSTEM

(71) Applicant: MITSUBISHI HEAVY INDUSTRIES AUTOMOTIVE THERMAL SYSTEMS, LTD., Minato-ku, Tokyo (JP)

(72) Inventors: Nobuya Nakagawa, Aichi (JP); Hirotsugu Kohigashi, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 15/520,255

(22) PCT Filed: Nov. 16, 2015

(86) PCT No.: PCT/JP2015/082108
§ 371 (c)(1),
(2) Date: Apr. 19, 2017

(87) PCT Pub. No.: WO2016/080343
PCT Pub. Date: May 26, 2016

(65) Prior Publication Data
US 2017/0320378 A1    Nov. 9, 2017

(30) Foreign Application Priority Data
Nov. 21, 2014    (JP) .................................. 2014-236724

(51) Int. Cl.
*B60H 1/32*    (2006.01)
*B60H 1/22*    (2006.01)
*B60H 1/00*    (2006.01)

(52) U.S. Cl.
CPC ........ *B60H 1/3204* (2013.01); *B60H 1/00007* (2013.01); *B60H 1/22* (2013.01); *B60H 1/3205* (2013.01)

(58) Field of Classification Search
CPC .... B60H 1/3204; B60H 1/3205; B60H 1/321; B60H 1/00007; B60H 1/22
(Continued)

(56) References Cited

U.S. PATENT DOCUMENTS 5,598,887 A    2/1997    Ikeda et al.
5,634,348 A *  6/1997    Ikeda ............... B60H 1/00735
                                                62/160

(Continued)

FOREIGN PATENT DOCUMENTS

JP    60-2847 A      1/1985
JP    5-319077 A    12/1993
(Continued)

*Primary Examiner* — Marc Norman
(74) *Attorney, Agent, or Firm* — Birch, Stewart, Kolasch & Birch, LLP.

(57) ABSTRACT

A refrigerant/heat medium heat exchanger that heats a heat medium which circulates in a heater core of an HVAC unit is provided in a discharge pipe of a cooling refrigerant circuit, a heating bypass circuit that extends to a receiver is connected to a downstream side of the refrigerant/heat medium heat exchanger through a switching means, a second circuit having a second decompression means is provided between an outlet of the receiver and a first end of a vehicle exterior heat exchanger, and a third circuit having a solenoid valve is provided between a second end of the vehicle exterior heat exchanger and an intake circuit. In a vehicle air-conditioning system, a heating refrigerant circuit is configured by an electric compressor, a refrigerant/heat medium heat exchanger, a switching means, a heating bypass circuit, a receiver, a second circuit, a vehicle exterior heat exchanger, and a third circuit. Consequently, while (Continued)

simplification of a configuration and the like are attained by diverting cooling refrigerant circuit and an HVAC of a current system, cooling/heating capacity can be ensured by diversifying heating heat sources, and operation in a frost formation delay mode or the like is possible during heating.

9 Claims, 3 Drawing Sheets

(58) Field of Classification Search
IPC .............. B60H 1/3204,1/3205, 1/321, 1/00007, 1/22
See application file for complete search history.

(56) References Cited

U.S. PATENT DOCUMENTS

| | | | |
|---|---|---|---|
| 2011/0113800 A1* | 5/2011 | Sekiya ............... | B60H 1/00278 62/151 |
| 2011/0167850 A1 | 7/2011 | Itoh et al. | |
| 2013/0139528 A1 | 6/2013 | Katayama et al. | |
| 2014/0223943 A1* | 8/2014 | Ichishi ................ | B60H 1/3205 62/215 |
| 2015/0121930 A1 | 5/2015 | Kasuya | |
| 2015/0354864 A1 | 12/2015 | Katayama et al. | |
| 2016/0052365 A1* | 2/2016 | Kohigashi .......... | B60H 1/00921 165/202 |

FOREIGN PATENT DOCUMENTS

| | | |
|---|---|---|
| JP | 7-232547 A | 9/1995 |
| JP | 9-286225 A | 11/1997 |
| JP | 11-170849 A | 6/1999 |
| JP | 3538845 B2 | 6/2004 |
| JP | 3704814 B2 | 10/2005 |
| JP | 2011-140291 A | 7/2011 |
| JP | 2012-96634 A | 5/2012 |
| JP | 2012-158197 A | 8/2012 |
| JP | 2014-8857 A | 1/2014 |
| JP | 2015-630 A | 1/2015 |

* cited by examiner

HEAT-PUMP-TYPE VEHICLE AIR-CONDITIONING SYSTEM

TECHNICAL FIELD

The present invention relates to a suitable heat-pump-type vehicle air-conditioning system suitably applied to an electrically driven vehicle such as an electric vehicle and a hybrid vehicle.

BACKGROUND ART

In vehicle air-conditioning systems used in electrically driven vehicles such as EV vehicles, HEV vehicles, and PHEV vehicles, heating operation utilizing combustion waste heat of engine cooling water (coolant) or the like cannot be performed. Therefore, a heat-pump-type air-conditioning system using an electric compressor is expected. However, in a case where a reverse type heat pump is used, heat exchangers such as pipes, an evaporator, and a condenser configuring a refrigerant circuit have to be usable together under different temperature and pressure conditions of cooling operation and heating operation, a vehicle air-conditioning system (hereinafter, referred to as a current system) applied to a current engine-driven vehicle has to be totally changed.

A heat-pump-type vehicle air-conditioning system, in which a heating refrigerant circuit is configured by utilizing a cooling refrigerant circuit of the current system as it is, and adding a vehicle interior condenser (also referred to as sub condenser) provided in an HVAC unit (Heating Ventilation and Air Conditioning Unit), or a vehicle exterior evaporator to the circuit through a selector valve, a bypass circuit, and the like, is provided by, for example, Patent Citation 1.

On the other hand, Patent Citation 2 discloses a heat-pump-type vehicle air-conditioning system, in which a heating bypass circuit is connected to a vehicle exterior condenser through a four-way valve, and a sub condenser is connected to an upstream side of an expansion valve, and the sub condenser is disposed on a downstream side of an evaporator in an HVAC unit. Patent Citation 3 discloses a heat-pump-type vehicle air-conditioning system, in which an evaporator is disposed on an upstream side in an HVAC unit, a vehicle interior condenser is disposed on a downstream side, a vehicle exterior heat exchanger which functions as a condenser during cooling and functions as an evaporator during heating is connected to a refrigerant inlet side of the vehicle interior condenser through a selector valve, a bypass circuit, and the like.

Furthermore, Patent Citation 4 discloses a heat-pump-type vehicle air-conditioning system, in which a vehicle interior evaporator is provided on an upstream side inside an HVAC, a heater core in which heat medium such as hot coolant can be circulated is provided on a downstream side, a refrigerant/heat medium heat exchanger that heats the heat medium such as hot coolant circulated in the heater core is provided in a discharge pipe of an electric compressor, and a heat pump cycle is configured by the refrigerant/heat medium heat exchanger, the vehicle exterior heat exchanger, the vehicle interior evaporator, and the like.

Patent Citation 1: Japanese Unexamined Patent Application, Publication No. 2012-96634

Patent Citation 2: Japanese Unexamined Patent Application, Publication No. Hei 11-170849

Patent Citation 3: Japanese Unexamined Patent Application, Publication No. Hei 5-319077 (the Publication of Japanese Patent No. 3538845)

Patent Citation 4: Japanese Unexamined Patent Application, Publication No. Hei 9-286225 (the Publication of Japanese Patent No. 3704814)

DISCLOSURE OF INVENTION

The systems described in above Patent Citation 1 to 3 each are a system that performs heating by providing the vehicle interior evaporator on the upstream side in the HVAC, providing the vehicle interior condenser on the downstream side, circulating high-temperature refrigerant gas in the vehicle interior condenser, and radiating heat, in order to construct a heat-pump-type system utilizing a cooling refrigerant circuit of a current system, although there is a difference in the heat exchanger, for example, a system using four heat exchangers, or a system using three heat exchangers. Therefore, there is not only a problem that the HVAC of the current system using the heater core in which a heat medium such as hot coolant is circulated cannot be diverted (C/O; carry-over) as it is, but also a problem that hot coolant waste heat and the like cannot be effectively utilized for heating even in a case of an electrically driven vehicle (PHEV vehicle) mounted with a gasoline engine.

On the other hand, in the system described in Patent Citation 4, the vehicle interior evaporator is provided on the upstream side in the HVAC, the heater core in which heat medium such as hot coolant is circulated is provided on the downstream side, and therefore the HVAC of the current system can be diverted as it is. However, a bypass circuit including a heating and dehumidifying decompression means is provided in parallel to the vehicle exterior heat exchanger. Therefore, there is a problem that dehumidifying bypass circuit needs to be provided in a cooling decompression means, and the circuit is complicated, and a problem that the vehicle exterior heat exchanger is easily to be frozen due to frost formation during heat-pump heating under a condition where the vehicle exterior heat exchanger is easily frosted at a low outside air temperature.

The present invention has been made in view of such circumstances, and an object of the present invention is to provide a heat-pump-type vehicle air-conditioning system, in which a cooling refrigerant circuit and an HVAC of a current system are diverted, cooling/heating capacity can be ensured by diversifying heating heat sources, while simplification of a configuration, miniaturization, and a low cost are attained, and furthermore, operation, for example, in a frost formation delay mode to a vehicle exterior heat exchanger is possible during heating.

In order to solve the above problems, a heat-pump-type vehicle air-conditioning system of the present invention employs the following solutions.

That is, a heat-pump-type vehicle air-conditioning system according to the present invention includes: a cooling refrigerant circuit in which an electric compressor, a vehicle exterior heat exchanger, a receiver, a first decompression means, a vehicle interior evaporator provided in an HVAC unit are connected in this order; a heater core that is disposed on a downstream side of the vehicle interior evaporator in the HVAC unit, and in which a heat medium including hot coolant is capable of being circulated; a refrigerant/heat medium heat exchanger that is provided in a discharge pipe of the electric compressor, and exchanges heat between the heat medium circulated in the heater core, and refrigerant gas discharged from the electric compressor; a heating bypass circuit having a first end connected to the discharge pipe of the electric compressor through a switching means on a downstream side of the refrigerant/heat medium heat exchanger, and a second end connected to the receiver; a second circuit that is connected between an outlet side of the receiver and a first end side of the vehicle exterior heat exchanger, and has a second decompression means; and a third circuit that is connected between a second end side of the vehicle exterior heat exchanger and an intake circuit of the electric compressor, and has a solenoid valve which is opened during heating, wherein a heating refrigerant circuit is capable of being configured by connecting the electric compressor, the refrigerant/heat medium heat exchanger, the switching means, the heating bypass circuit, the receiver, the second circuit having the second decompression means, the vehicle exterior heat exchanger, and the third circuit having the solenoid valve in this order, the downstream side of the refrigerant/heat medium heat exchanger is directly connected to the second end side of the vehicle exterior heat exchanger through the switching means, the switching means and the receiver are directly connected by the heating bypass circuit, and in a heating mode, when the vehicle exterior heat exchanger is frosted, the heating refrigerant circuit is switched to the cooling refrigerant circuit, and a high-temperature and high-pressure refrigerant which passes through the refrigerant/heat medium heat exchanger is directly introduced into the vehicle exterior heat exchanger, so that defrosting is possible.

According to the present invention, the cooling refrigerant circuit is configured by connecting the electric compressor, the vehicle exterior heat exchanger, the receiver, the first decompression means, and the vehicle interior evaporator provided in the HVAC unit in this order, the refrigerant/heat medium heat exchanger is provided in the discharge pipe for the cooling refrigerant circuit, so that the heat medium which is heat-exchanged by the refrigerant/heat medium heat exchanger can be circulated in the heater core disposed on the downstream side of the vehicle interior evaporator in the HVAC unit.

With this, the heating bypass circuit having the first end connected to the discharge pipe of the electric compressor through the switching means on the downstream side of the refrigerant/heat medium heat exchanger, and the second end connected to the receiver is provided, and furthermore, the second circuit that is connected between the outlet side of the receiver and the first end side of the vehicle exterior heat exchanger, and has the second decompression means, and the third circuit that is connected between the second end side of the vehicle exterior heat exchanger and the intake circuit of the electric compressor are provided, and has the solenoid valve which is opened during heating, are provided. Consequently, the heating refrigerant circuit is capable of being configured by connecting the electric compressor, the refrigerant/heat medium heat exchanger, the switching means, the heating bypass circuit, the receiver, the second circuit including the second decompression means, the vehicle exterior heat exchanger, and the third circuit having the solenoid valve in this order.

Therefore, the heat-pump-type system can be formed by diverting the cooling refrigerant circuit substantially equal to a cooling refrigerant circuit of a current system and the HVAC unit including the vehicle interior evaporator and the heater core as they are, and adding the refrigerant/heat medium heat exchanger, the switching means, the heating bypass circuit, the second circuit having the second decompression means, and the third circuit having the solenoid valve to the system.

Two heat exchangers of the vehicle interior evaporator and the vehicle exterior heat exchanger (functioning as a condenser) function in a cooling mode, and two heat exchangers of the refrigerant/heat medium heat exchanger and the vehicle exterior heat exchanger (functioning as an evaporator) function in the heating mode, so that it is possible to perform cooling operation and heating operation.

Therefore, it is possible to perform efficient cooling operation and heating operation with maximum capability that is appropriate for work load of the electric compressor, and improve cooling/heating capacity. Additionally, the heat-pump-type air-conditioning system can be configured by adding a minimum number of heating apparatuses, and it is possible to attain simplification of a configuration, miniaturization, a low cost.

In addition, as the HVAC unit, the HVAC equal to an HVAC of a current system, in which the heater core in which a heat medium including hot coolant is circulated is disposed on the downstream side of the vehicle interior evaporator, can be diverted as it is, and therefore, for example, waste heat of an engine, a motor, an inverter, and the like can be retrieved by the heat medium, or the heat medium can be heated by a PTC heater to be used as a heat source for heating. That is, it is possible to continue heating operation even at an extremely low temperature or even in defrosting, which makes difficult to perform heat-pump heating, by utilizing various heat sources.

Additionally, the refrigerant/heat medium heat exchanger is provided in the discharge pipe of the electric compressor, and the switching means is provided on the downstream side, and therefore the switching means can be installed on a CRFM (Condenser Radiator and Fan Motor) side, and it is possible to improve mountability on a vehicle.

Additionally, according to the present invention, in the heating mode, when the vehicle exterior heat exchanger is frosted, the refrigerant circuit is switched to the cooling circuit by the switching means, and the high-temperature and high-pressure refrigerant is directly introduced into the vehicle exterior evaporator, so that it is possible to efficiently perform defrosting. Therefore, it is possible to shorten defrost time, and it is possible to perform defrosting even at a low outside air temperature of 0° C. or less.

Furthermore, according to the heat-pump-type vehicle air-conditioning system of the present invention, in any of the above heat-pump-type vehicle air-conditioning systems, the first decompression means and the second decompression means each are a decompression means with an on-off valve function, and both the vehicle exterior heat exchanger and the vehicle interior evaporator are usable together as evaporators in a heating mode by use of the on-off valve functions.

According to the present invention, in the heating mode, under the frost formation condition to the vehicle exterior heat exchanger, the frost formation delay mode is set, opening and closing of the on-off valve function of the first decompression means and the on-off valve function of the second decompression means are alternately controlled, so that a part of the refrigerant is circulated in the vehicle interior evaporator through the first decompression means, and refrigerant circulation quantity to the vehicle exterior heat exchanger can be reduced. Consequently, while frost formation and the progress of the frost formation are delayed, and fluctuation of a blow-out air temperature is suppressed, the heating operation can be stably continued. Therefore, it is possible to improve heating performance of the heat-pump-type vehicle air-conditioning system.

Furthermore, according to the heat-pump-type vehicle air-conditioning system of the present invention, in any of the above heat-pump-type vehicle air-conditioning systems, the first decompression means and the second decompression means each are a thermostatic expansion valve with a solenoid valve or an electronic expansion valve.

According to the present invention, in a case where the first decompression means and the second decompression means each are the thermostatic expansion valve with a solenoid valve, opening and closing of the solenoid valve enables the refrigerant to flow through or can block the refrigerant. When the solenoid valve is opened, a refrigerant flow rate can be controlled such that the refrigerant superheat degree of the outlet of the vehicle exterior heat exchanger or the outlet of the vehicle interior evaporator is made constant by the thermostatic expansion valve.

In a case where the first decompression means and the second decompression means each are the electronic expansion valve, the refrigerant can be allowed to flow or be blocked by full closing and full opening functions of the electronic expansion valve, and the refrigerant superheat degree of the outlet of the vehicle exterior heat exchanger or the outlet of the vehicle interior evaporator can be controlled by the opening adjustment function.

Therefore, in accordance with the operation mode, the first decompression means and the second decompression means can be switched by use of the on-off valve functions. Additionally, in the heating mode, operation using the vehicle exterior heat exchanger and the vehicle interior evaporator together can be performed.

Furthermore, according to the heat-pump-type vehicle air-conditioning system of the present invention, in any of the above heat-pump-type vehicle air-conditioning systems, the first decompression means is a decompression means with an on-off valve function, the second circuit provided with the second decompression means is provided with a check valve that allows only refrigerant flow from the outlet side of the receiver toward the vehicle exterior heat exchanger as an alternative means of the on-off valve function, and the on-off valve function of the first decompression means and the solenoid valve of the third circuit are used, so that both the vehicle exterior heat exchanger and the vehicle interior evaporator are usable together as evaporators in a heating mode.

According to the present invention, in the heating mode, under the frost formation condition to the vehicle exterior heat exchanger, the frost formation delay mode is set, opening and closing of the on-off valve function of the first decompression means and the solenoid valve of the second circuit are alternately controlled, so that a part of the refrigerant is circulated in the vehicle interior evaporator through the first decompression means, and refrigerant circulation quantity to the vehicle exterior heat exchanger is reduced. Consequently, while frost formation and the progress of the frost formation are delayed, and fluctuation of a blow-out air temperature is suppressed, the heating operation can be stably continued. Therefore, it is possible to improve heating performance of the heat-pump-type vehicle air-conditioning system.

Furthermore, according to the heat-pump-type vehicle air-conditioning system of the present invention, in any of the above heat-pump-type vehicle air-conditioning systems, in a heating mode, in response to an outlet refrigerant temperature of the vehicle exterior heat exchanger, and a temperature of blow-out air from the vehicle interior evaporator or a fin temperature, opening and closing of the on-off valve function of the first decompression means, and the on-off valve function of the second decompression means or the solenoid valve of the third circuit are alternately controlled, and the refrigerant is alternately allowed to flow through or blocked from the vehicle exterior heat exchanger and the vehicle interior evaporator.

According to the present invention, in the heating mode, under the frost formation condition to the vehicle exterior evaporator, in response to the outlet refrigerant temperature of the vehicle exterior heat exchanger, and the temperature of the blow-out air from the vehicle interior evaporator or the fin temperature, and the refrigerant is alternately allowed to flow through or blocked from the vehicle exterior heat exchanger and the vehicle interior evaporator, so that the mode is set to the frost formation delay mode, and refrigerant circulation quantity to the vehicle exterior heat exchanger can be reduced.

Consequently, while it is possible to delay frost formation on the vehicle exterior evaporator and the progress of frost formation, reduction in the blow-out air temperature due to the cooling in the vehicle interior evaporator can be suppressed. The above is repeated, so that operation can be performed while the temperature fluctuation width is suppressed in a constant range. Therefore, during heating, while the frost formation on the vehicle exterior evaporator and the progress of the frost formation are delayed, and the fluctuation of the blow-out air temperature is suppressed, it is possible to stably continue heating operation.

According to the present invention, the heat-pump-type system can be formed by diverting the cooling refrigerant circuit substantially equal to a cooling refrigerant circuit of a current system and the HVAC unit including the vehicle interior evaporator and the heater core as they are, and adding the refrigerant/heat medium heat exchanger, the switching means, the heating bypass circuit, the second circuit having the second decompression means, and the third circuit having the solenoid valve to the system.

Additionally, two heat exchangers of the vehicle interior evaporator and the vehicle exterior heat exchanger function in a cooling mode, and two heat exchangers of the refrigerant/heat medium heat exchanger and the vehicle exterior heat exchanger function in the heating mode, so that it is possible to perform cooling operation and heating operation.

Therefore, it is possible to perform efficient cooling operation and heating operation with maximum capability that is appropriate for work load of the electric compressor, and improve cooling/heating capacity. Additionally, the heat-pump-type air-conditioning system can be configured by adding a minimum number of heating apparatuses, and it is possible to attain simplification of a configuration, miniaturization, a low cost.

In addition, as the HVAC unit, the HVAC equal to an HVAC of a current system, in which the heater core in which a heat medium including hot coolant is circulated is disposed on the downstream side of the vehicle interior evaporator, can be diverted as it is, and therefore, for example, waste heat of an engine, a motor, an inverter, and the like can be retrieved by the heat medium, or the heat medium can be heated by a PTC heater to be used as a heat source for heating. That is, it is possible to continue heating operation even at an extremely low temperature or even in defrosting, which makes difficult to perform heat-pump heating, by utilizing various heat sources.

Additionally, the refrigerant/heat medium heat exchanger is provided in the discharge pipe of the electric compressor, and the switching means is provided on the downstream side, and therefore the switching means can be installed on a CRFM (Condenser Radiator and Fan Motor) side, and it is possible to improve mountability on a vehicle.

BEST MODE FOR CARRYING OUT THE INVENTION

Hereinafter, embodiments according to the present invention will be described with reference to the drawings.

First Embodiment

Hereinafter, a first embodiment of the present invention will be described with reference to FIG. 1 to FIG. 3.

Figure 1:
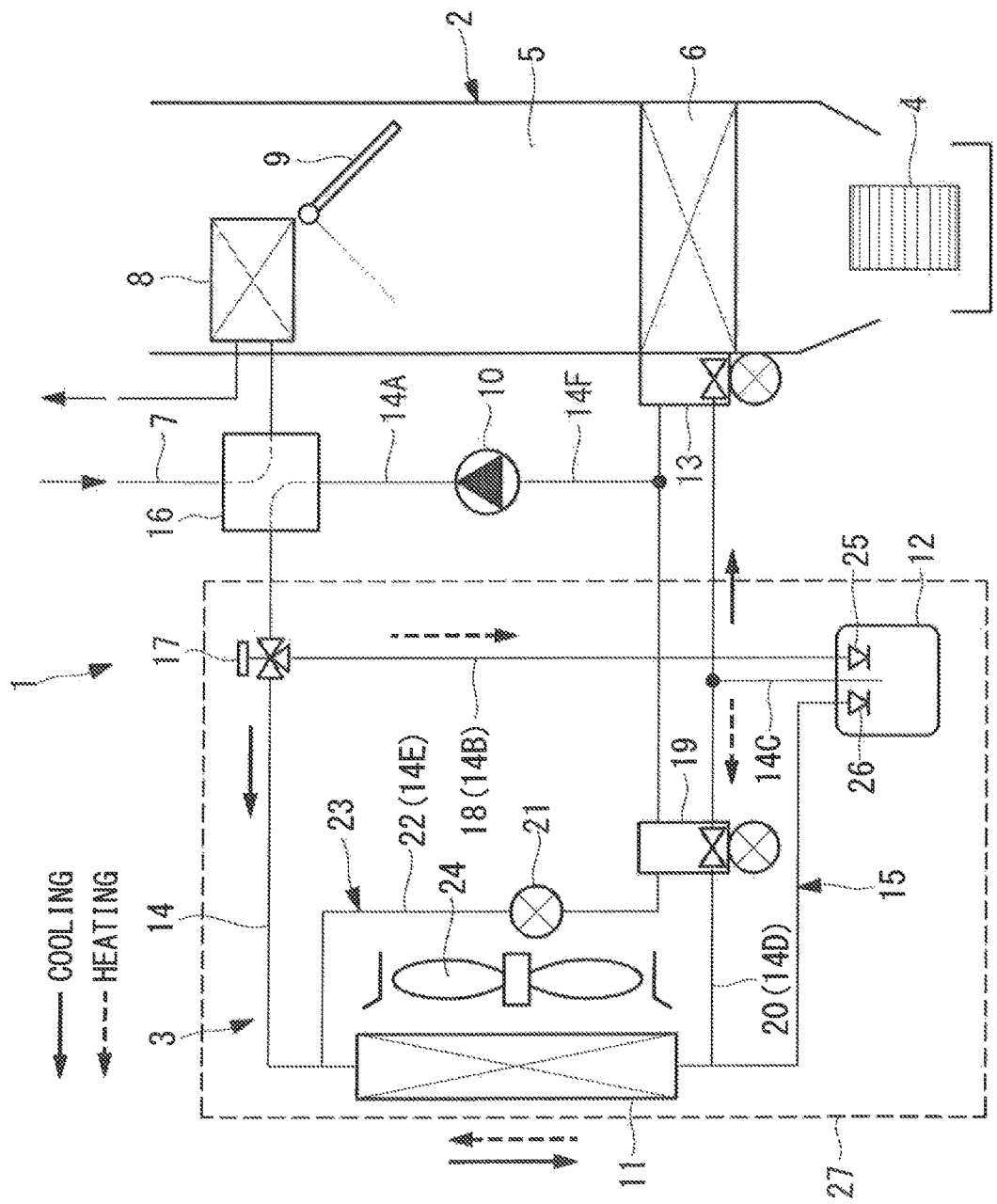
FIG. 1 is a schematic configuration diagram (refrigerant circuit diagram) of a heat-pump-type vehicle air-conditioning system according to a first embodiment of the present invention.
Figure 2A:
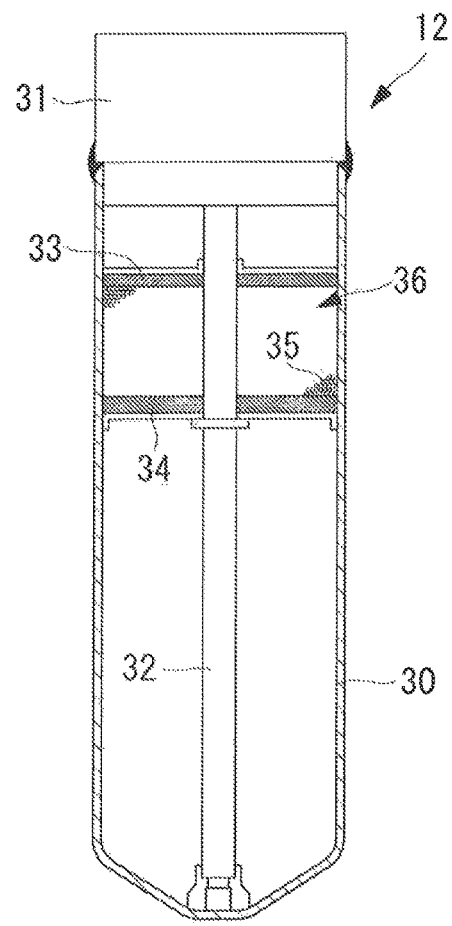
FIGS. 2(A), 2(B) and 2(C) are a longitudinal sectional view of a receiver incorporated in the above heat-pump-type vehicle air-conditioning system, a plan view of the receiver, and an a-a cross-section equivalent diagram of FIG. 2(B), respectively.
Figure 2B:
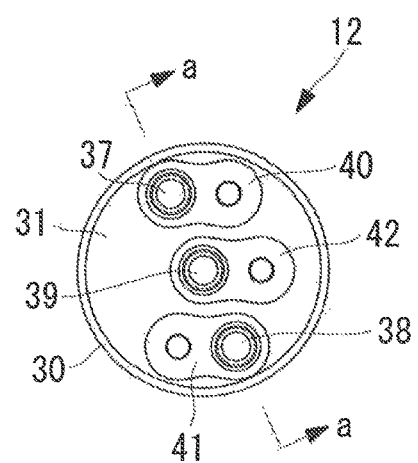
Figure 2C:
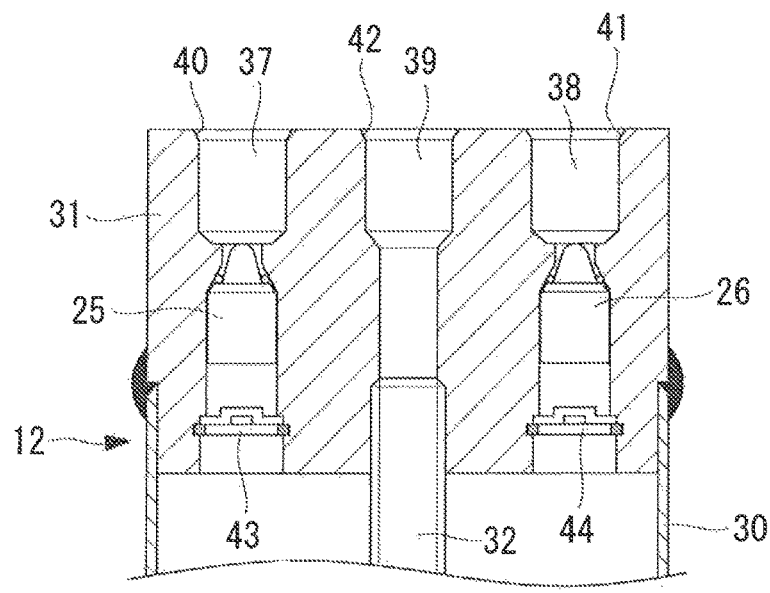
Figure 3:
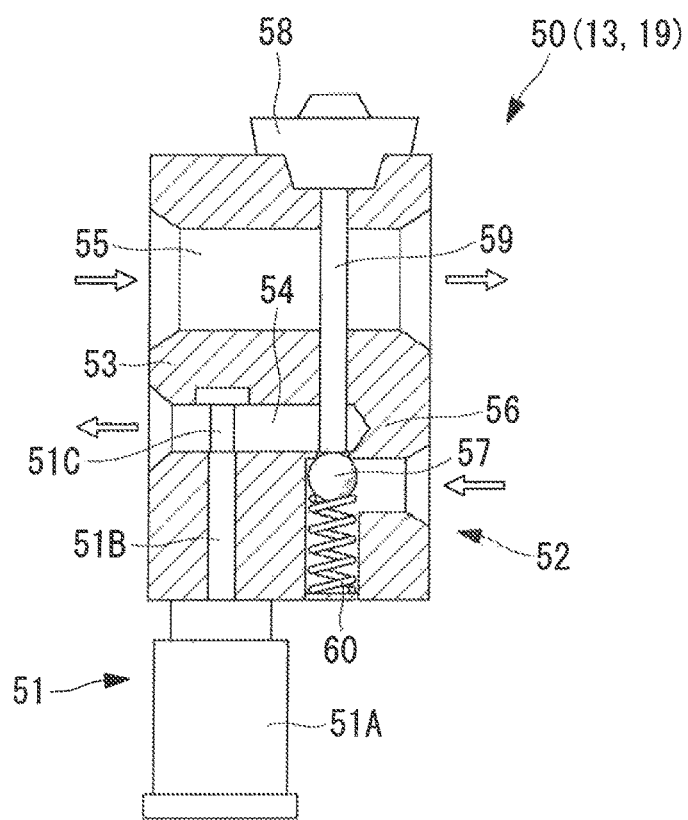
FIG. 3 is a configuration diagram of a thermostatic expansion valve with a solenoid valve incorporated in the above heat-pump-type vehicle air-conditioning system.

FIG. 1 is a schematic configuration diagram of a heat-pump-type vehicle air-conditioning system according to the first embodiment of the present invention, FIG. 2 is a configuration diagram of a receiver incorporated in this system, and FIG. 3 is a configuration diagram of a thermostatic expansion valve with a solenoid valve incorporated in this system.

A heat-pump-type vehicle air-conditioning system 1 according to this embodiment includes an HVAC unit (Heating Ventilation and Air Conditioning Unit) 2, and a heat-pump-type refrigerant circuit 3 enabling cooling and heating.

The HVAC unit 2 includes a blower 4 that switches and introduces either inside air from the inside of a vehicle interior or outside air, and forcibly feeds the introduced air to the downstream side, a vehicle interior evaporator 6 that is disposed on the upstream side of the inside of an air flow passage 5 continued to the blower 4, a heater core 8 that is disposed on the downstream side, and in which heat medium such as hot coolant can be circulated through a heat medium circulation circuit 7, and an air mix door 9 that adjusts a ratio of air quantity that is bypassed to air quantity that flows through the heater core 8, and adjusts the temperature of temperature conditioning air blown out into the vehicle interior.

This HVAC unit 2 does not differ from an HVAC unit that is incorporated in a vehicle air-conditioning system (hereinafter, referred to as a current system) applied to a current engine-driven vehicle, and uses a heat source for heating obtained by circulating cooling water (coolant) of an engine for a vehicle in the heat core, and the HVAC unit 2 is installed inside an instrument panel on a vehicle interior, and selectively blows out temperature conditioning air from a plurality of outlets opened toward the inside of the vehicle interior, to the inside of the vehicle interior.

In addition to a refrigerant/heat medium heat exchanger 16 on the side of the heat-pump-type refrigerant circuit 3 described below, the heat medium circulation circuit 7 that circulates a heat medium such as hot coolant in the heater core 8 is provided with an waste heat recovery apparatus for waste heat from the engine of the electrically driven vehicle (PHEV vehicle) mounted with the engine, waste heat from a vehicle driving apparatus such as a motor and an inverter or the like, is further provided with a heat source apparatus such as a PTC heater, and is configured such that various heat can be effectively utilized as the heat source for heating.

The heat-pump-type refrigerant circuit 3 capable of performing switch between a cooling cycle and a heating cycle includes a cooling refrigerant circuit (cooling cycle) 15 of a closed cycle, in which an electric compressor 10 that compresses a refrigerant, a vehicle exterior heat exchanger (which functions as a condenser during cooling, and functions as an evaporator during heating) 11, a receiver 12, a first decompression means 13 with an on-off valve function, and a vehicle interior evaporator 6 provided in the HVAC unit 2 are connected in this order through a refrigerant pipe 14. This cooling refrigerant circuit 15 can be made to be substantially equal to a refrigerant circuit used in a current vehicle air-conditioning system applied to an engine-driven vehicle.

The heat-pump-type refrigerant circuit 3 is provided with a refrigerant/heat medium heat exchanger 16 that exchanges heat between a high-temperature and high-pressure refrigerant gas discharged from the electric compressor 10 and a heat medium circulated in the heat medium circulation circuit 7 to the heater core 8, in a discharge pipe (discharge circuit) 14A from the electric compressor 10, and is provided with a three-way valve (switching means) 17 on the downstream side. A heating bypass circuit 18 is connected to this three-way valve 17, and a second end thereof is connected to the receiver 12, so that during heating, a refrigerant condensed in the refrigerant/heat medium heat exchanger 16 can be introduced into the receiver 12.

A heating second circuit 20 including a second decompression means 19 with an on-off valve function is connected between an outlet refrigerant pipe 14C of the receiver 12 and the refrigerant outlet side during cooling operation of the vehicle exterior heat exchanger 11 (first end side of the vehicle exterior heat exchanger 11), and a heating third circuit 22 including a solenoid valve 21 is connected between the refrigerant inlet side during cooling operation of the vehicle exterior heat exchanger 11 (second end side of the vehicle exterior heat exchanger 11), and an intake pipe (intake circuit) 14F to the electric compressor 10.

Consequently, it is possible to configure the heating refrigerant circuit (heating cycle) 23 of a closed cycle, in which the electric compressor 10, the refrigerant/heat medium heat exchanger 16, the three-way valve 17, the heating bypass circuit 18, the receiver 12, the second circuit 20 including the second decompression means 19 with an on-off valve function, the vehicle exterior heat exchanger 11, and the third circuit 22 including the solenoid valve 21 are connected in this order through the refrigerant pipes 14A, 14B (heating bypass circuit 18), 14C, 14D (second circuit 20), 14E (third circuit 22), 14F. A fan 24 for allowing outside air to flow is attached on the vehicle exterior heat exchanger 11.

Furthermore, the above receiver 12 is a receiver 12 with a check valve integrally incorporated with check valves 25, 26 in two refrigerant flow inlets connected to the heating bypass circuit 18 from the three-way valve 17 and the refrigerant pipe 14 from the vehicle exterior heat exchanger 11. As illustrated in FIG. 2, this receiver 12 is the receiver 12 with a check valve incorporated with a dryer including a cylindrical body 30 having a bottom, a lid 31 welded to a first end opening of the body 30, a refrigerant outflow pipe 32 having a first end connected to the lid 31, and having a second end extending up to the vicinity of the bottom of the body 30, and a dryer 36 formed by filling a desiccant 35 between a pair of upper and lower filters 33, 34 installed in an upper part of the body 30.

As described above, the lid 31 is provided with the two refrigerant flow inlets 37, 38 connected to the heating bypass circuit 18 (refrigerant pipe 14B) and the refrigerant pipe 14 from the vehicle exterior heat exchanger 11, and a refrigerant outflow port 39 connected to the outlet refrigerant pipe 14C. The refrigerant flow inlets 37, 38 and the refrigerant outflow port 39 are provided with fitting sections 40, 41, 42 for connecting the refrigerant pipes, respectively, the refrigerant pipe 14, 14B and the outlet refrigerant pipe 14C are connectable to each other through the fitting sections 40, 41, 42. Additionally, in the refrigerant flow inlets 37, 38, the check valves 25, 26 are incorporated through snap rings and stoppers 43, 44.

As the first decompression means 13 with an on-off valve function and the second decompression means 19, a thermostatic expansion valve 50 with a solenoid valve illustrated in FIG. 3 can be used. The thermostatic expansion valve 50 with a solenoid valve is provided on the refrigerant inlet side of each of the vehicle interior evaporator 6 and the vehicle exterior heat exchanger 11 that functions as an evaporator, and is configured by integrating a valve main body 53 including an inlet side refrigerant flow passage 54 and an outlet side refrigerant flow passage 55 to each of these evaporators, a solenoid valve 51 that is provided in the valve main body 53, and opens and closes the inlet side refrigerant flow passage 54, and a thermostatic expansion valve 52 that is seated on a valve seat 56 provided in the inlet side refrigerant flow passage 54, and includes a ball valve 57 for adjusting the opening.

The solenoid valve 51 includes an electromagnetic coil 51A, a moving core 51B, and a valve body 51C that is provided in a leading end of the moving core 51B, and opens and closes the inlet side refrigerant flow passage 54, and is configured such that the moving core 51B axially moves forward and backward by energization to the electromagnetic coil 51A, and the valve body 51C opens and closes the inlet side refrigerant flow passage 54. Additionally, the thermostatic expansion valve 52 senses the temperature and the pressure of a refrigerant inside the outlet side refrigerant flow passage 55 for allowing refrigerants evaporated in the vehicle interior evaporator 6 and the vehicle exterior heat exchanger 11 to flow, through a temperature sensitive cylinder and a diaphragm 58, moves a shaft 59 forward and backward by the differential pressure, and presses the ball valve 57 urged by a spring 60 to adjust the opening. The solenoid valve 51 and the thermostatic expansion valve 52 may be an independent individual standard solenoid valve, and an independent individual standard thermostatic expansion valve which are connected in series.

During operation using one or both of the vehicle interior evaporator 6 and the vehicle exterior heat exchanger 11 functioning as an evaporator, by use of the above thermostatic expansion valve 50 with a solenoid valve, the solenoid valve 51 is opened, a refrigerant adiabatically expanded by the thermostatic expansion valve 52 through the inlet side refrigerant flow passage 54 is supplied to the vehicle interior evaporator 6 and the vehicle exterior heat exchanger 11, so that the refrigerant flow rate can be automatically controlled by the thermostatic expansion valve 52 such that the refrigerant superheat degree of each evaporator outlet is made constant. Consequently, it is possible to simplify a configuration and attain a low cost, compared to a system, in which an electronic expansion valve that requires a refrigerant pressure detection means and a refrigerant temperature detection means is used.

However, in the present invention, as each of the first decompression means 13 with an on-off valve function and the second decompression means 19 with an on-off valve function, in place of the thermostatic expansion valve 50 with a solenoid valve, an electronic expansion valve may be used, and use of the electronic expansion valve is not excluded. The thermostatic expansion valve 50 with a solenoid valve contains a component formed by connecting an independent individual solenoid valve to an independent individual thermostatic expansion valve in series, in addition to a component formed by integrating the solenoid valve 51 with the thermostatic expansion valve 52. In the present invention, a component formed by adding an electronic expansion valve having the above function to these is collectively referred, and is defined as the decompression means 13 with an on-off valve function and the decompression means 19 with an on-off valve function.

In the above heat-pump-type vehicle air-conditioning system 1, in a cooling mode, a refrigerant compressed by the electric compressor 10 flows through the refrigerant/heat medium heat exchanger 16, the three-way valve 17, the vehicle exterior heat exchanger 11 functioning as a condenser, the receiver 12, the first decompression means 13 with an on-off valve function, and the vehicle interior evaporator 6 in this order, and circulates in the cooling refrigerant circuit (cooling cycle) 15 which returns to the electric compressor 10 again, as illustrated by solid line arrows.

On the other hand, in a heating mode, a refrigerant compressed by the electric compressor 10 flows through the refrigerant/heat medium heat exchanger 16, the three-way valve 17, the heating bypass circuit 18, the receiver 12, the second circuit 20 including the second decompression means 19 with an on-off valve function, the vehicle exterior heat exchanger 11 functioning as an evaporator, and the third circuit 22 including the solenoid valve 21 in this order and circulates in the heating refrigerant circuit (heating cycle) 23 which returns to the electric compressor 10 again, as illustrated by broken line arrows. In the refrigerant/heat medium heat exchanger 16, a heat medium such as hot coolant that circulates in the heat medium circulation circuit 7 is heated, and is supplied to the heater core 8.

Herein, when heating operation is continued under a frost formation condition where an outside air temperature is low, the vehicle exterior heat exchanger 11 functioning as an evaporator is frosted. When the frost grows and a whole surface of the vehicle exterior heat exchanger 11 is frozen, heat exchange with outside air is hindered, and heat-pump heating becomes difficult. However, even when the vehicle exterior heat exchanger 11 is frosted, the heating operation can be stably continued by delaying the growth. Therefore, in this embodiment, in the heating mode, the following configuration is employed in order to delay the progress of the frost formation in the vehicle exterior heat exchanger 11.

That is, the first decompression means 13 and the second decompression means 19 each are the thermostatic expansion valve 50 with a solenoid valve with an on-off valve function, and therefore in the heating mode where the refrigerant circulates as illustrated by the broken line arrows, for example, in a case where the outlet refrigerant temperature of the vehicle exterior heat exchanger 11 is lowered to a preset temperature or less, and there is a fear that the vehicle exterior heat exchanger 11 is frosted, the solenoid valve 51 of the thermostatic expansion valve 50 with a solenoid valve configuring the second decompression means 19 is closed, the solenoid valve 51 of the thermostatic expansion valve 50 with a solenoid valve configuring the first decompression means 13 is opened, and a refrigerant is allowed to flow to the vehicle interior evaporator 6 side, so that the vehicle interior evaporator 6 functions as an evaporator, and heating operation can be continued. Consequently, it is possible to lower heat absorbing capability in the vehicle exterior heat exchanger 11, and suppress the progress of frost formation.

At this time, there is a case where the vehicle interior evaporator 6 acts, dehumidifying and heating operation is performed, and the preset temperature of temperature conditioning air heated and blown out by the heater core 8 cannot be maintained, and therefore the temperature of the air blown out from the vehicle interior evaporator 6 or the temperature of the fin is detected. When the detected temperature is a set value or less, the on-off valve function of the first decompression means 13 (solenoid valve 51 of the thermostatic expansion valve 50 with a solenoid valve) is closed, the on-off valve function of the second decompression means 19 (solenoid valve 51 of the thermostatic expansion valve 50 with a solenoid valve) is opened, so that operation for allowing the refrigerant to flow to the vehicle exterior heat exchanger 11 side is repeated. Consequently, heating operation can be stably continued, while the temperature fluctuation width is suppressed within a constant range by delaying frost formation.

Furthermore, in this embodiment, the heater core 8 and the vehicle interior evaporator 6 are caused to act at the same time, so that operation in a dehumidifying and heating mode is possible. That is, the first decompression means 13 and the second decompression means 19 each are the thermostatic expansion valve 50 with a solenoid valve with an on-off valve function. Therefore, the refrigerant circuit is switched to the heating refrigerant circuit (heating cycle) 23, a refrigerant discharged from the electric compressor 10 flows through the refrigerant/heat medium heat exchanger 16, the three-way valve 17, the heating bypass circuit 18, the receiver 12, the second circuit 20 including the second decompression means 19, the vehicle exterior heat exchanger 11, and the third circuit 22 including the solenoid valve 21, and is circulated in the heating refrigerant circuit 23 that returns to the electric compressor 10, as illustrated by the broken line arrows, while the on-off valve function of the first decompression means 13 is opened, so that a part of the refrigerant can be circulated from the receiver 12 to the vehicle interior evaporator 6.

Consequently, air cooled and dehumidified by the vehicle interior evaporator 6 is heated by the heater core 8, and is blown out into the vehicle interior, so that dehumidifying and heating operation is possible. In this case, mere heating of the air cooled and dehumidified by the vehicle interior evaporator 6 by the heater core 8 cannot ensure a so-called temperature linearity characteristic that the temperature of the air blown out into the vehicle interior is changed following the change of the preset temperature. However, in this dehumidifying and heating mode, while the refrigerant flows in the vehicle exterior heat exchanger 11 functioning as an evaporator and the vehicle interior evaporator 6, and the both evaporators are used together and operated, for example, the temperature of the air blown out from the vehicle interior evaporator 6 or the fin temperature is detected, closing and opening of the on-off valve function of the first decompression means 13 is controlled in response to the temperature, and cooling quantity in the vehicle interior evaporator 6 is adjusted, so that it is possible to ensure the temperature linearity characteristic.

The three-way valve 17 that switches the heat-pump-type refrigerant circuit 3 between the cooling refrigerant circuit (cooling cycle) 15 and the heating refrigerant circuit (heating cycle) 23 is provided on the downstream side of the refrigerant/heat medium heat exchanger 16 provided in the discharge pipe 14A from the electric compressor 10 as described above, and therefore the three-way valve 17 is provided on the CRFM (Condenser Radiator and Fan Motor) 27 side and is integrated as described above, as illustrated in FIG. 1, so that the three-way valve 17 can be mounted on the vehicle.

With the above described configuration, the following effects of this embodiment are exerted.

First, in the cooling mode, high-temperature and high-pressure refrigerant gas compressed by the electric compressor 10 is guided to the vehicle exterior heat exchanger 11 functioning as a condenser through the refrigerant/heat medium heat exchanger 16 and the three-way valve 17 by the discharge pipe 14A, is heat-exchanged with outside air passed by the fan 24 herein, and is condensed and liquefied. The solenoid valve 51 of the thermostatic expansion valve 50 with a solenoid valve configuring the second decompression means 19 is closed. Therefore, after this liquid refrigerant is introduced into the receiver 12 through the check valve 26, and is stored once, the liquid refrigerant is guided to the first decompression means 13 through the outlet refrigerant pipe 14C, is decompressed to be brought into a gas-liquid two phase state, and is supplied to the vehicle interior evaporator 6.

The refrigerant that is heat-exchanged with inside air blown from the blower 4 by the vehicle interior evaporator 6, or outside air to be evaporated is suck into the electric compressor 10 through the intake pipe 14F to be recompressed. Hereinafter, a similar cycle is repeated. This cooling refrigerant circuit 15 is not differ from a cooling refrigerant circuit (cooling cycle) of a current system used in an engine-driven vehicle, and can be used in common as it is. In the process of passing through the vehicle interior evaporator 6, the inside air or the outside air that is heat-exchanged with the refrigerant to be cooled is blown out into the vehicle interior, so that the inside air or the outside air is supplied for cooling of the inside of the vehicle interior.

In the cooling mode, the heat medium circulation circuit 7 that circulates the heat medium in the refrigerant/heat medium heat exchanger 16 and the heater core 8 is closed, so that it is possible to suspend the heat exchange in the refrigerant/heat medium heat exchanger 16.

In the heating mode, the refrigerant compressed by the electric compressor 10 is guided to the refrigerant/heat medium heat exchanger 16 through the discharge pipe 14A, is heat-exchanged with the heat medium that circulates in the heat medium circulation circuit 7, is condensed and liquefied, and heats the heat medium. This heat medium is circulated in the heater core 8 to be supplied for heating. The refrigerant condensed in the refrigerant/heat medium heat exchanger 16 is introduced into the receiver 12 through the three-way valve 17 and the heating bypass circuit 18, and is stored once. Thereafter, the solenoid valve 51 of the thermostatic expansion valve 50 with a solenoid valve configuring the first decompression means 13 is closed, and therefore the condensed refrigerant is guided to the second decompression means 19 through the outlet refrigerant pipe 14C, and the second circuit 20, is brought into a decompressed gas-liquid two phase state herein, and is supplied to the vehicle exterior heat exchanger 11.

At this time, a refrigerant in the refrigerant pipe 14 connecting the vehicle exterior heat exchanger 11 to the receiver 12 flows in the forward direction with respect to the check valve 26. However, the pressure of the inside of the refrigerant pipe 14 is low, and the pressure of the inside of the receiver 12 is high, and therefore the check valve 26 can be kept in the closed state by this pressure difference, the refrigerant does not flow from the vehicle exterior heat exchanger 11 side to the receiver 12 through the refrigerant pipe 14. Accordingly, the refrigerant supplied to the vehicle exterior heat exchanger 11 is heat-exchanged with outside air blown by the fan 21 in the vehicle exterior heat exchanger 11 functioning as an evaporator, the heat is absorbed from outside air, and the refrigerant is evaporated. Thereafter, the evaporated refrigerant is sucked into the electric compressor 10 through the third circuit 22 including the solenoid valve 21, and the intake pipe 14F, and is recompressed. Hereinafter, a similar cycle is repeated, and the heat-pump heating using outside air as a heat source can be performed by this heating refrigerant circuit 23.

On the other hand, in a heating operation mode, the vehicle exterior heat exchanger 11 functioning as an evaporator is frosted depending on an outside air condition, and the vehicle exterior heat exchanger 11 is sometimes frozen. In this case, frost needs to be melted. In this embodiment, the heating refrigerant circuit 23 is switched to the cooling refrigerant circuit 15 to shift to a defrost mode, and the refrigerant discharged from the electric compressor 10 is directly introduced into the vehicle exterior heat exchanger 11 through the refrigerant/heat medium heat exchanger 16 and the three-way valve 17, so that the high-temperature and high-pressure refrigerant heats the vehicle exterior heat exchanger 11, and it is possible to efficiently defrost. Accordingly, even at a low outside air temperature of 0° C. or less, defrost can be performed without being influenced by the temperature.

However, in this embodiment, in case where during operation in the heating mode, the outside air temperature is lowered, which result in a condition where the vehicle exterior heat exchanger 11 is frosted, for example, when the outlet refrigerant temperature of the vehicle exterior heat exchanger 11 is detected, and the temperature becomes the preset temperature or less, the heating mode is switched to the frost formation delay mode, frost formation on the vehicle exterior heat exchanger 11 or the progress of the frost formation can be delayed. This frost formation delay mode is for alternately opening and closing the solenoid valves 51 of the thermostatic expansion valve 50 with solenoid valves configuring the first decompression means 13 and the second decompression means 19 while maintaining the heating refrigerant circuit 23, the refrigerant is allowed to flow also in the vehicle interior evaporator 6, so that refrigerant circulation quantity to the vehicle exterior heat exchanger 11 is reduced, heat absorbing capability in the vehicle exterior heat exchanger 11 is reduced. Consequently, frost formation on the vehicle exterior heat exchanger 11 or the progress of the frost formation is suppressed.

In the frost formation delay mode, when the outlet refrigerant temperature of the vehicle exterior heat exchanger 11 becomes the preset temperature or less, the on-off valve function of the second decompression means 19 is closed, the on-off valve function of the first decompression means 13 is opened, and the refrigerant is allowed to flow in the vehicle interior evaporator 6, so that the frost formation on the vehicle exterior heat exchanger 11 is suppressed. However, when the operation is continued, air is cooled by evaporation action in the vehicle interior evaporator 6, and the temperature of air heated by the heater core 8 and blown out into the vehicle interior is lowered. Therefore, when the air blown out from the vehicle interior evaporator 6 or the fin temperature is detected, and becomes the set value or less, the on-off valve function of the first decompression means 13 is closed, the on-off valve function of the second decompression means 19 is opened, and the refrigerant is allowed to flow in the vehicle exterior heat exchanger 11 again. The above is repeated, so that while the progress of the frost formation is suppressed, the temperature fluctuation width of the air blown out into the inside of the vehicle interior is suppressed, so that it is possible not to give discomfort feeling to a crew member.

Furthermore, in this embodiment, not only operation in the heating mode but also the on-off valve function of the first decompression means 13 are utilized, so that operation in the dehumidifying and heating mode is possible. This dehumidifying and heating mode is for opening and closing the solenoid valve 51 of the thermostatic expansion valve 50 with a solenoid valve configuring the first decompression means 13 while maintaining the heating refrigerant circuit 23 in the heating mode, allowing the refrigerant to flow in the vehicle interior evaporator 6 at the same time, cooling the vehicle interior evaporator 6, heating the dehumidified air in the heater core 8 to blow out into the vehicle interior, and performing dehumidifying and heating operation.

At this time, mere heating of air cooled and dehumidified by the vehicle interior evaporator 6 by the heater core 8 cannot ensure a temperature linearity characteristic that the temperature of the air blown out into the vehicle interior is changed following the change of the preset temperature. However, for example, the temperature of the air blown out from the vehicle interior evaporator 6 or the fin temperature is detected, closing and opening of the solenoid valve 51 of the thermostatic expansion valve 50 with a solenoid valve configuring the first decompression means 13 is controlled in response to the temperature, and cooling quantity in the vehicle interior evaporator 6 is adjusted, so that it is possible to ensure the temperature linearity characteristic.

Thus, according to this embodiment, the heat-pump-type refrigerant circuit 3 can be configured by adding the refrigerant/heat medium heat exchanger 16, the three-way valve 17, the heating bypass circuit 18, and the second circuit 20 having the second decompression means 19, and the third circuit 22 having the solenoid valve 21 to the cooling refrigerant circuit 15 which is substantially equal to a cooling refrigerant circuit of a current system. Furthermore, the HVAC unit 2 similar to an HVAC of the current system, in which the vehicle interior evaporator 6 is disposed on the upstream side, and the heater core 8 in which heat medium such as hot coolant can be circulated is disposed on the downstream side, can be used.

Consequently, two heat exchangers of the vehicle interior evaporator 6 and the vehicle exterior heat exchanger 11 (functioning as a condenser) function in the cooling mode, and two heat exchangers of the refrigerant/heat medium heat exchanger 16 and the vehicle exterior heat exchanger 11 (functioning as an evaporator) function in the heating mode, so that it is possible to perform cooling operation and heating operation.

Therefore, it is possible to perform efficient cooling operation and heating operation with maximum capability that is appropriate for work load of the electric compressor 10, and improve cooling/heating capacity. Additionally, the heat-pump-type air-conditioning system 1 can be configured by adding a minimum number of heating apparatuses, and it is possible to attain simplification of a configuration, miniaturization, and a low cost.

As the HVAC unit 2, an HVAC equal to a current system, in which the heater core 8 in which a heat medium including hot coolant is circulated is disposed on the downstream side of the vehicle interior evaporator 6, can be diverted as it is, and therefore, weste heat of an engine, a motor, an inverter, and the like as driving apparatus of a vehicle can be retrieved by the heat medium, or the heat medium can be heated by a PTC heater or the like to be used as a heat source for heating. That is, it is possible to perform heating by utilizing various heat sources. Furthermore, the refrigerant/heat medium heat exchanger 16 is provided in the discharge pipe 14A of the electric compressor 10, and the three-way valve (switching means) 17 is provided on the downstream side, and therefore the three-way valve 17 can be installed on the CRFM 27 side, and it is possible to improve mountability on a vehicle.

In the heating mode, when the vehicle exterior heat exchanger 11 functioning as an evaporator is frosted, the heating refrigerant circuit (heating cycle) 23 is switched to the cooling refrigerant circuit (cooling cycle) 15, and the refrigerant discharged from the electric compressor 10 is directly introduced into the vehicle exterior heat exchanger 11 through the refrigerant/heat medium heat exchanger 16 and the three-way valve 17, so that it is possible to efficiently defrost. Therefore, it is possible to shorten defrost time, defrost at an outside air temperature of 0° C. or less is possible, and outside air temperature range enabling defrost can be widened.

Furthermore, the receiver 12 incorporated in the above system 1 is the receiver 12 with a check valve incorporated with the check valves 25, 26 in the refrigerant flow inlet, and therefore the cooling or heating refrigerant circuits 15, 23 which are not used in an operation mode are blocked by the check valves 25, 26 incorporated in the refrigerant flow inlets 37, 38 of the receiver 12, so that it is possible to hinder backflow of the refrigerant to these circuits 15, 23. Therefore, it is possible to prevent the refrigerant flow to the unused refrigerant circuits 15, 23, and it is possible to reduce the number of components for connection such as a flange to attain simplification and a low cost of the refrigerant circuit 3, compared to a system in which the receiver 12, and the check valves 25, 26 are individually provided in the refrigerant circuit 3.

The first decompression means 13 and the second decompression means 19 each are a decompression means with an on-off valve function, and therefore while the operation mode is set to the heating mode and operation is performed, the on-off valve function of the first decompression means 13 is used, opening and closing of the on-off valve function is controlled, and a part of the refrigerant is allowed to flow in the vehicle interior evaporator 6, and air is cooled and dehumidified herein, so that it is possible to perform operation in the dehumidifying and heating mode. At this time, the on-off valve function is opened and closed, and a blow-out air temperature from the vehicle interior evaporator 6 is changed, so that it is possible to ensure a temperature linearity characteristic (followability to the preset temperature) in the dehumidifying and heating mode.

Similarly, in the heating mode, under the frost formation condition to the vehicle exterior heat exchanger 11, the frost formation delay mode is set, opening and closing of the first decompression means 13 and the on-off valve function of the second decompression means 19 are alternately controlled, so that a part of the refrigerant is circulated in the vehicle interior evaporator 6 through the first decompression means 13, and refrigerant circulation quantity to the vehicle exterior heat exchanger 11 is reduced. Consequently, while frost formation on the vehicle exterior heat exchanger 11 and the progress of the frost formation are delayed, and fluctuation of a blow-out air temperature is suppressed, the heating operation can be stably continued. Therefore, it is possible to improve heating performance of the heat-pump-type vehicle air-conditioning system 1.

The first decompression means 13 and the second decompression means 19 each are the thermostatic expansion valve 50 with a solenoid valve or the electronic expansion valve. In a case where the first decompression means 13 and the second decompression means 19 each are the thermostatic expansion valve 50 with a solenoid valve, opening and closing of the solenoid valve 51 enables the refrigerant to flow through or can block the refrigerant. When the solenoid valve 51 is opened, the refrigerant superheat degrees of the outlets of the vehicle exterior heat exchanger 11 and the vehicle interior evaporator 6 can be each controlled at a constant level by the thermostatic expansion valve 52. In a case where the first decompression means 13 and the second decompression means 19 each are the electronic expansion valve, the refrigerant can be allowed to flow or be blocked by full closing and full opening functions of the electronic expansion valve, and the refrigerant superheat degree of the outlet of each of the vehicle exterior heat exchanger 11 and the vehicle interior evaporator 6 can be controlled by the opening adjustment function.

Therefore, in accordance with the operation mode, the first decompression means 13 and the second decompression means 19 can be switched by use of the on-off valve function. Additionally, in the heating mode and the dehumidifying and heating mode, operation using the vehicle exterior heat exchanger 11 and the vehicle interior evaporator 6 together can be performed.

Furthermore, in this embodiment, in the dehumidifying and heating mode, opening and closing of the on-off valve function of the first decompression means 13 is controlled in response to the temperature of blow-out air from the vehicle interior evaporator 6 or the fin temperature, so that the refrigerant to the vehicle interior evaporator 6 is allowed to flow, or is blocked.

Therefore, when the air cooled and dehumidified by the vehicle interior evaporator 6 is heated by the heater core 8 located on the downstream side, and is the dehumidified and heated, mere heating and blow-out of the air cooled and dehumidified by the vehicle interior evaporator 6 by the vehicle interior condenser cannot ensure a temperature linearity characteristic.

However, the refrigerant to the vehicle interior evaporator 6 is allowed to flow or is blocked in response to the temperature of the blow-out air from the vehicle interior evaporator 6 or the fin temperature, and cooling quantity in the vehicle interior evaporator 6 is changed, so that it is possible to change the temperature of the blow-out air. Therefore, also in the dehumidifying and heating mode, the temperature linearity characteristic can be reliably ensured.

In the heating mode, under the frost formation condition to the vehicle exterior heat exchanger 11, opening and closing of the on-off valve function of the first decompression means 13 and the on-off valve function of the second decompression means 19 are controlled in response to the outlet refrigerant temperature of the vehicle exterior heat exchanger 11, the temperature of the blow-out air from the vehicle interior evaporator 6, or the fin temperature, the refrigerant is alternately allowed to flow through or blocked from the vehicle exterior heat exchanger 11 and the vehicle interior evaporator 6, and refrigerant circulation quantity to the vehicle exterior heat exchanger 11 is reduced, so that while it is possible to delay the progress of frost formation on the vehicle exterior heat exchanger 11, reduction in the blow-out air temperature due to the cooling in the vehicle interior evaporator 6 can be suppressed. The above is repeated, so that operation can be performed while the temperature fluctuation width is suppressed in a constant range. Therefore, during heating, while the frost formation on the vehicle exterior heat exchanger 11 and the progress of the frost formation are delayed, and the fluctuation of the blow-out air temperature is suppressed, it is possible to stably continue heating operation.

Second Embodiment

Now, a second embodiment of the present invention will be described.

In the above first embodiment, the second decompression means 19 is the thermostatic expansion valve 50 with a solenoid valve, so that the second decompression means 19 has the on-off valve function. However, the second decompression means 19 provided in the heating second circuit 20 is made to be a thermostatic expansion valve which is the simple thermostatic expansion valve 52 by removing the solenoid valve 51 from the thermostatic expansion valve 50 with a solenoid valve illustrated in FIG. 3, and a check valve (not illustrated) which allows only flow of a refrigerant from the outlet side of the receiver 12 to the vehicle exterior heat exchanger 11 side may be provided on the vehicle exterior heat exchanger 11 side of the second circuit 20.

As described above, also when a second decompression means 19 provided in a second circuit 20 is made to be a thermostatic expansion valve 52 which does not have an on-off valve function, the check valve is provided on a vehicle exterior heat exchanger 11 side of the second circuit 20, operation in each of a cooling mode (defrost mode), a heating mode, a frost formation delay mode, and a dehumidifying and a heating mode can be performed similarly to the first embodiment. At this time, in the cooling mode and the defrost mode, a refrigerant of the inside of the second circuit 20 flows in the forward direction with respect to the check valve. The pressure on the vehicle exterior heat exchanger 11 side of the check valve is high, the pressure on the second decompression means 19 side is low, and therefore the check valve is maintained in a closed state by the pressure difference, and the refrigerant does not flow from the outlet side of a receiver 12 to the vehicle exterior heat exchanger 11 side through the second circuit 20.

Thus, also in this embodiment, while the operation mode is set to the heating mode, an on-off valve function of a first decompression means 13 (thermostatic expansion valve 50 with a solenoid valve) is used, opening and closing of the on-off valve function is controlled, and a part of a refrigerant is allowed to flow in a vehicle interior evaporator 6, and air is cooled and dehumidified herein, so that it is possible to perform operation in the dehumidifying and heating mode. At this time, the on-off valve function is opened and closed, and a blow-out air temperature from the vehicle interior evaporator 6 is changed, so that it is possible to ensure a temperature linearity characteristic (followability to the preset temperature) also in the dehumidifying and heating mode.

In the heating mode, under a condition where the vehicle exterior heat exchanger 11 may be frosted, the frost formation delay mode is set, opening and closing of the on-off valve function of the first decompression means 13 and a solenoid valve 21 of a third circuit 22 are alternately controlled, so that a part of a refrigerant is circulated in the vehicle interior evaporator 6 through the first decompression means 13, and refrigerant circulation quantity to the vehicle exterior heat exchanger 11 is reduced. Consequently, while frost formation on the vehicle exterior heat exchanger 11 and the progress of the frost formation are delayed, and fluctuation of a blow-out air temperature is suppressed, the heating operation can be stably continued. Therefore, heating performance of a heat-pump-type vehicle air-conditioning system 1 can be improved also by this configuration.

The present invention is not limited to the invention according to the above embodiments, and can be suitably modified. For example, in the above embodiments, the three-way valve 17 is used as a refrigerant switching means. However, the three-way valve may be replaced with two solenoid valves or a four-way valve.

EXPLANATION OF REFERENCE

1: heat-pump-type vehicle air-conditioning system
2: HVAC unit
3: heat-pump-type refrigerant circuit
6: vehicle interior evaporator
7: heat medium circulation circuit
8: heater core
10: electric compressor
11: vehicle exterior heat exchanger
12: receiver (receiver with check valve)
13: first decompression means with on-off valve function
14A: discharge pipe (discharge circuit)
14F: intake pipe (intake circuit)
15: cooling refrigerant circuit (cooling cycle)
16: refrigerant/heat medium heat exchanger
17: three-way valve (switching means)
18: heating bypass circuit
19: second decompression means with on-off valve function
20: second circuit
21: solenoid valve
22: third circuit
23: heating refrigerant circuit (heating cycle)
50: thermostatic expansion valve with solenoid valve
51: solenoid valve
52: thermostatic expansion valve

The invention claimed is:

1. A heat-pump-type vehicle air-conditioning system comprising:
    a cooling refrigerant circuit in which an electric compressor, a vehicle exterior heat exchanger, a receiver, a first decompression means, a vehicle interior evaporator provided in an HVAC unit are connected in this order;
    a heater core that is disposed on a downstream side of the vehicle interior evaporator in the HVAC unit, and in which a heat medium including hot water is capable of being circulated;
    a refrigerant/heat medium heat exchanger that is provided in a discharge pipe of the electric compressor, and exchanges heat between the heat medium circulated in the heater core, and refrigerant gas discharged from the electric compressor;
    a heating bypass circuit having a first end connected to the discharge pipe of the electric compressor through a switching means on a downstream side of the refrigerant/heat medium heat exchanger, and a second end connected to the receiver;
    a second circuit that is connected between an outlet side of the receiver and a first end side of the vehicle exterior heat exchanger, and has a second decompression means; and
    a third circuit that is connected between a second end side of the vehicle exterior heat exchanger and an intake circuit of the electric compressor, and has a solenoid valve which is opened during heating, wherein a heating refrigerant circuit is capable of being configured by connecting the electric compressor, the refrigerant/heat medium heat exchanger, the switching means, the heating bypass circuit, the receiver, the second circuit having the second decompression means, the vehicle exterior heat exchanger, and the third circuit having the solenoid valve in this order, the downstream side of the refrigerant/heat medium heat exchanger is directly connected to the second end side of the vehicle exterior heat exchanger through the switching means, the switching means and the receiver are directly connected by the heating bypass circuit, and in a heating mode, when the vehicle exterior heat exchanger is frosted, the heating refrigerant circuit is switched to the cooling refrigerant circuit, and a high-temperature and high-pressure refrigerant which passes through the refrigerant/heat medium heat exchanger is directly introduced into the vehicle exterior heat exchanger, so that defrosting is possible.

2. The heat-pump-type vehicle air-conditioning system according to claim 1, wherein the first decompression means and the second decompression means each are a decompression means with an on-off valve function, and both the vehicle exterior heat exchanger and the vehicle interior evaporator are usable together as evaporators in a heating mode by use of the on-off valve functions.

3. The heat-pump-type vehicle air-conditioning system according to claim 2, wherein in a heating mode, in response to an outlet refrigerant temperature of the vehicle exterior heat exchanger, and a temperature of blow-out air from the vehicle interior evaporator or a fin temperature, opening and closing of the on-off valve function of the first decompression means, and the on-off valve function of the second decompression means or the solenoid valve of the third circuit are alternately controlled, and the refrigerant is alternately allowed to flow through or blocked from the vehicle exterior heat exchanger and the vehicle interior evaporator.

4. The heat-pump-type vehicle air-conditioning system according to claim 2, wherein the first decompression means and the second decompression means each are a temperature type automatic expansion valve with a solenoid valve or an electronic expansion valve.

5. The heat-pump-type vehicle air-conditioning system according to claim 4, wherein in a heating mode, in response to an outlet refrigerant temperature of the vehicle exterior heat exchanger, and a temperature of blow-out air from the vehicle interior evaporator or a fin temperature, opening and closing of the on-off valve function of the first decompression means, and the on-off valve function of the second decompression means or the solenoid valve of the third circuit are alternately controlled, and the refrigerant is alternately allowed to flow through or blocked from the vehicle exterior heat exchanger and the vehicle interior evaporator.

6. The heat-pump-type vehicle air-conditioning system according to claim 1, wherein the first decompression means and the second decompression means each are a temperature type automatic expansion valve with a solenoid valve or an electronic expansion valve.

7. The heat-pump-type vehicle air-conditioning system according to claim 6, wherein in a heating mode, in response to an outlet refrigerant temperature of the vehicle exterior heat exchanger, and a temperature of blow-out air from the vehicle interior evaporator or a fin temperature, opening and closing of the on-off valve function of the first decompression means, and the on-off valve function of the second decompression means or the solenoid valve of the third circuit are alternately controlled, and the refrigerant is alternately allowed to flow through or blocked from the vehicle exterior heat exchanger and the vehicle interior evaporator.

8. The heat-pump-type vehicle air-conditioning system according to claim 1, wherein the first decompression means is a decompression means with an on-off valve function, the second circuit provided with the second decompression means is provided with a check valve that allows only refrigerant flow from the outlet side of the receiver toward the vehicle exterior heat exchanger as an alternative means of the on-off valve function, and the on-off valve function of the first decompression means and the solenoid valve of the third circuit are used, so that both the vehicle exterior heat exchanger and the vehicle interior evaporator are usable together as evaporators in a heating mode.

9. The heat-pump-type vehicle air-conditioning system according to claim 8, wherein in a heating mode, in response to an outlet refrigerant temperature of the vehicle exterior heat exchanger, and a temperature of blow-out air from the vehicle interior evaporator or a fin temperature, opening and closing of the on-off valve function of the first decompression means, and the on-off valve function of the second decompression means or the solenoid valve of the third circuit are alternately controlled, and the refrigerant is alternately allowed to flow through or blocked from the vehicle exterior heat exchanger and the vehicle interior evaporator.

* * * * *